United States Patent [19]

Sanada et al.

[11] 4,181,111
[45] Jan. 1, 1980

[54] METHOD FOR FEEDING A FUEL AND A FUEL FEED DEVICE FOR USE IN AN INTERNAL COMBUSTION ENGINE

[75] Inventors: Masakatsu Sanada, Toyota; Masahiko Nakada, Okazaki, both of Japan

[73] Assignee: Toyota Jidosha Kogyo Kabushiki Kaisha, Aichi, Japan

[21] Appl. No.: 799,918

[22] Filed: May 24, 1977

[30] Foreign Application Priority Data

Mar. 17, 1977 [JP] Japan ................... 52-28665

[51] Int. Cl.² .......................................... F02M 31/00
[52] U.S. Cl. ............................. 123/133; 123/122 E; 261/145
[58] Field of Search ............. 123/122 E, 122 F, 133, 123/3; 261/144, 145, 142

[56] References Cited

U.S. PATENT DOCUMENTS

| 1,382,995 | 6/1921 | Lucke | 123/3 |
| 1,559,216 | 10/1925 | Woolson | 123/3 |
| 1,576,766 | 3/1926 | Kloepper | 123/3 |
| 4,037,568 | 7/1977 | Schreiber | 123/3 |

Primary Examiner—Ronald H. Lazarus
Attorney, Agent, or Firm—Stevens, Davis, Miller & Mosher

[57] ABSTRACT

Disclosed is a fuel feed device of an internal combustion engine. A heating device is disposed in the fuel supply conduit communicating the carburetor with the fuel tank for vaporizing the low boiling components in the fuel. The liquid fuel containing bubbles of the fuel vapor therein is introduced into a low boiling component separator. In this separator, the low boiling components in the fuel are removed and then the liquid fuel consisting of the high boiling components is fed into the carburetor.

16 Claims, 3 Drawing Figures

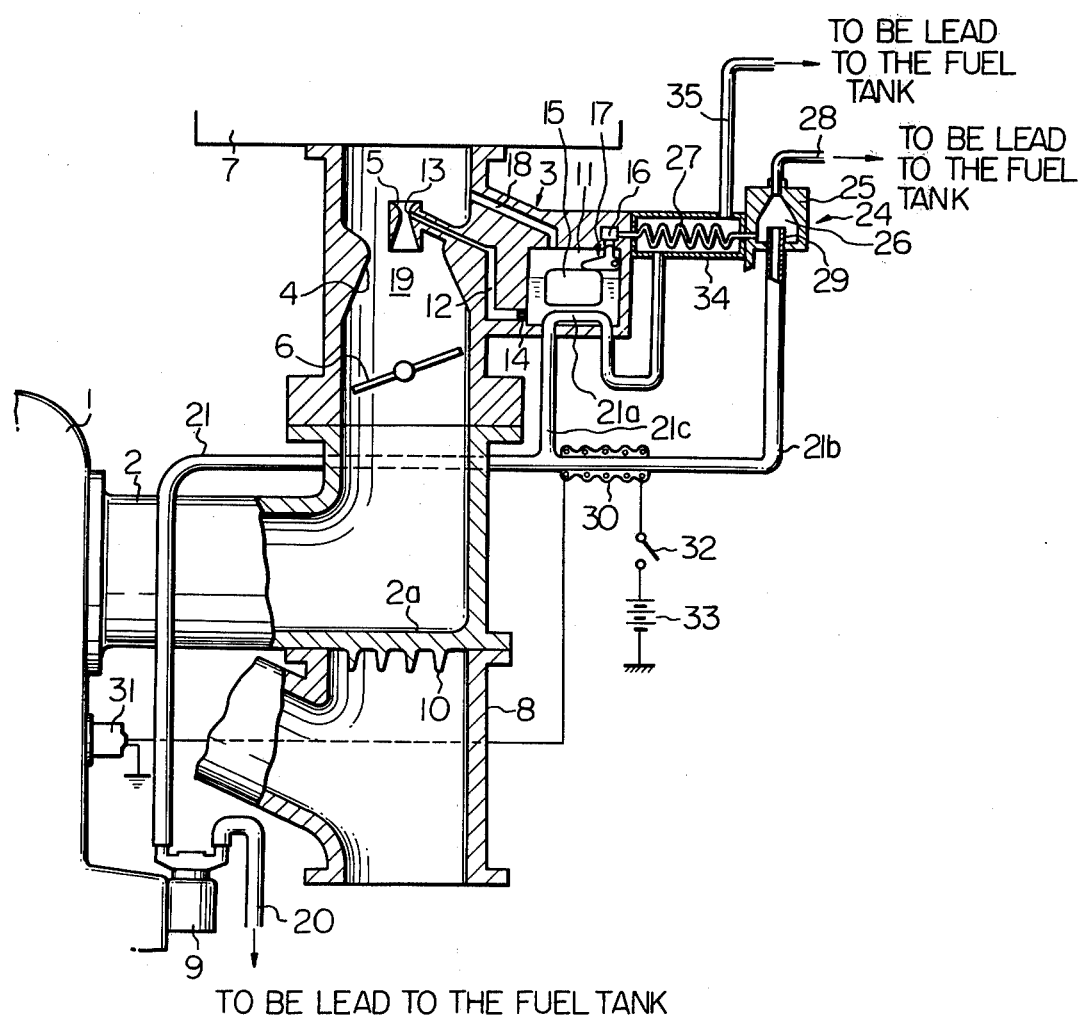

METHOD FOR FEEDING A FUEL AND A FUEL FEED DEVICE FOR USE IN AN INTERNAL COMBUSTION ENGINE

DESCRIPTION OF THE INVENTION

The present invention relates to a method for feeding fuel and to a fuel feed device of an internal combustion engine.

In general, when the temperature of an engine is increased to a great extent, the low boiling components in the fuel contained in a carburetor or in a fuel supply conduit interconnecting a carburetor with a fuel tank are vaporized. As a result of this, the fuel vapor is discharged from the float chamber of the carburetor into the introduced air flowing in the intake passage via the air vent of the carburetor. In addition, the fuel in the fuel passage formed in the carburetor is pushed upwards by the bubbles of the fuel vapor whereby an excessive amount of fuel is injected into the intake passage from the main nozzle of the carburetor. When the temperature of an engine is high, if the fuel vapor is fed into the introduced air from the float chamber via the air vent or if an excessive amount of fuel is fed into the intake passage from the main nozzle as mentioned above, the air-fuel mixture fed into the cylinder of the engine becomes excessively rich. As a result, problems are caused wherein a desired operating condition of the engine cannot be obtained, and wherein a large amount of unburned HC and CO components is discharged into the exhaust system of the engine.

These problems can be solved by maintaining the temperature of the carburetor at a temperature which is lower than the boiling point of the low boiling components. However, this is very difficult in practical application. That is, it is very difficult to maintain the carburetor at a relatively low temperature, particularly in an engine adopting an exhaust gas heating system in which the intake manifold is heated by the exhaust gas for promoting the vaporization of fuel in the intake manifold, whereby the warm-up of the engine is improved. Consequently, in a conventional engine and particularly in an engine adopting such an exhaust gas heating system, if the engine is constructed for improving the warm-up of the engine, there occurs a problem in that, when the temperature of the engine is high, the temperature of the carburetor is increased to such a great extent that the air-fuel mixture fed into the cylinder of the engine becomes excessively rich.

An object of the present invention is to provide a method of feeding a fuel and to provide a fuel feed device which are capable of always forming an air-fuel mixture of an optimum air-fuel ratio in the intake passage of the engine.

According to the present invention, there is provided a method of feeding a fuel in an internal combustion engine having a fuel reservoir and a carburetor, said method comprising the steps of: heating the fuel introduced into the carburetor from the fuel reservoir for creating bubbles consisting of the low boiling components of the fuel when the temperature of the engine is elevated beyond a predetermined level, and; removing said bubbles from the fuel for feeding a liquid fuel consisting of the high boiling components into the carburetor.

In addition, according to the present invention, there is provided a fuel feed device of an internal combustion engine, comprising: a carburetor having a float chamber therein; a fuel reservoir; a fuel supply passage communicating said float chamber with said fuel reservoir and having a portion of the passage disposed in a heat source for vaporizing the low boiling components in the fuel, and; a separating means disposed in said fuel supply passage between said passage portion and said float chamber for respectively separating low boiling components and high boiling components from the fuel fed into said float chamber.

The present invention may be more fully understood from the description set forth below of preferred embodiments of the invention, together with the accompanying drawings.

BRIEF DESCRIPTION OF THE DRAWINGS

In the drawings:

FIG. 3 is a schematic side view, partly in cross section, of a further embodiment according to the present invention.

DESCRIPTION OF PREFERRED EMBODIMENTS

Figure 1:
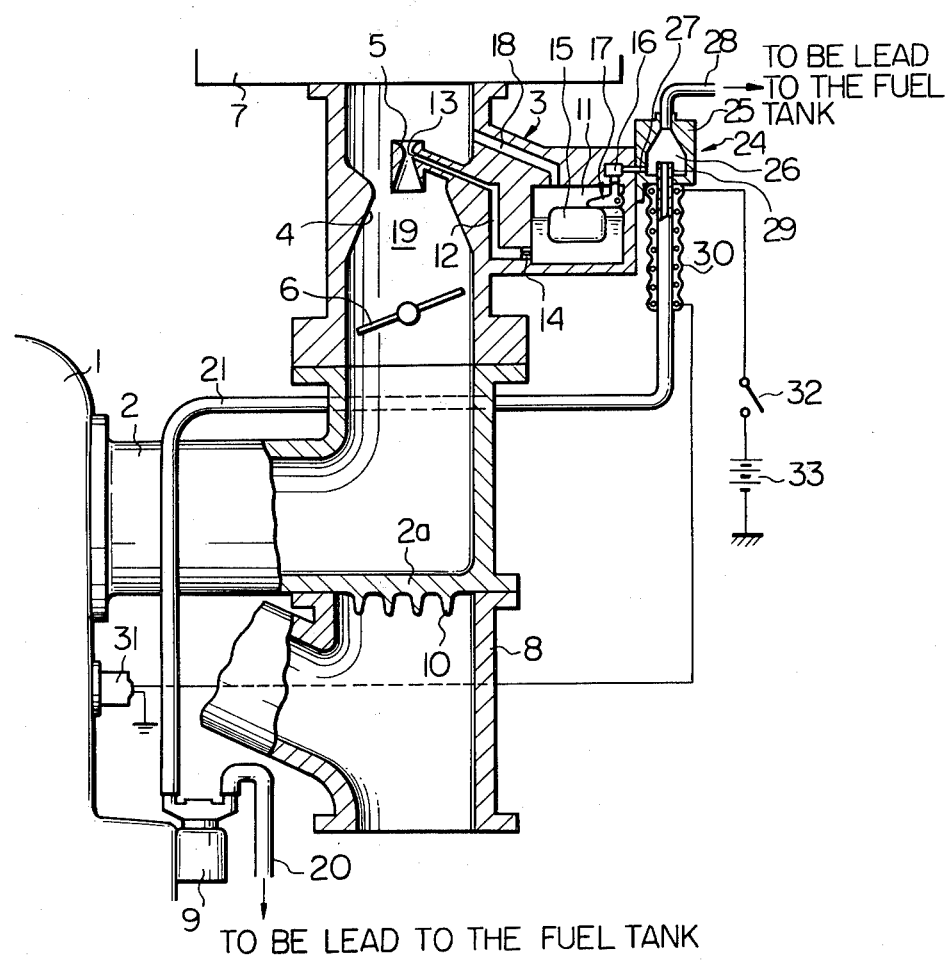
FIG. 1 is a schematic side view, partly in cross section, of an embodiment of a fuel feed device according to the present invention.

Referring to the Figure, 1 designates an engine body, 2 an intake manifold, 3 a carburetor, 4 a large venturi of the carburetor 3, 5 a small venturi, 6 a throttle valve, 7 an air cleaner, 8 an exhaust manifold and 9 a fuel pump driven by the engine. A number of fins 10 are formed on the lower surface of the riser portion 2a of the intake manifold 2. As a result, the riser portion 2a is effectively heated by the exhaust gas flowing in the exhaust manifold 8. The carburetor 3 has in its housing a float chamber 11 and a fuel passage 12. This fuel passage 12 is connected to a main nozzle 13 opening into the small venturi 5 on one hand, and to the float chamber 11 via a fuel metering jet 14 on the other hand. In addition, disposed in the housing of the carburetor 3 is a needle valve mechanism 17 connected to the float member 15 for controlling an amount of the fuel fed into the float chamber 11 from a fuel supply passage 16. The inside of the float chamber 11 is connected to an intake passage 19 via an air vent 18. Thus, the pressure in the float chamber 11 is always maintained at atmospheric pressure.

Fuel is fed into a low boiling component separator 24 attached to the carburetor 3 from a fuel tank (not shown) via fuel supply conduits 20 and 21 by the fuel pump 9. This low boiling component separator 24 has in its housing 25 a separating chamber 26. The lower half of the separating chamber 26 is formed in a cylindrical shape, while the upper half of the separating chamber 26 is formed in a conical shape. The lower end of the separating chamber 26 is connected to the fuel supply passage 16 via a fuel passage 27, while the upper end of the separating chamber 26 is connected to the fuel tank via a conduit 28. A fuel injection pipe 29 is arranged in the separating chamber 26 so as to project into the separating chamber 26 from the bottom thereof. This fuel injection pipe 29 is connected to the fuel supply conduit 21.

A heating member 30 is arranged around the fuel supply conduit 21 so as to enclose it at a position near the low boiling component separator 24. This heating member 30 is connected to a temperature detecting switch 31 detecting the temperature of the engine body 1 on one hand, and to a power source 33 via an ignition switch 32 on the other hand. This temperature detecting switch 31 is turned to the ON condition when the temperature of the engine body 1 is elevated beyond a predetermined temperature, while the temperature detecting switch 31 is turned to the OFF condition when the temperature of the engine body 1 is lowered below a predetermined temperature. Consequently, when the temperature of the engine body 1 is elevated beyond a predetermined temperature, the heating operation of the heating member 30 is carried out and, as a result, the fuel in the fuel supply conduit 21 is heated. On the other hand, the heating operation of the heating member 30 may be controlled so that the amount of heat fed into the fuel in the fuel supply conduit 21 is increased in accordance with an increase in the temperature of the engine body 1 in such a way that, instead of using the temperature detecting switch 31, a temperature detector is used for detecting the temperature of the engine body 1, and this temperature detector is connected to the heating member 30 via an electrical control circuit.

In operation, when the temperature of the engine is relatively low and, accordingly, when the heating operation of the heating member 30 remains inactive, since the fuel passing through the fuel passage 21 is not vaporized, liquid fuel containing no fuel vapor therein is introduced into the separating chamber 26. Then, a large part of the fuel introduced into the separating chamber 26 is fed into the float chamber 11 via the fuel passage 27, the fuel supply passage 26 and the needle valve mechanism 17. On the other hand, the remaining fuel is returned to the fuel tank via the conduit 28.

Contrary to this, when the temperature of the engine is relatively high and, accordingly, when the heating operation of the heating member 30 is carried out, the low boiling components in the fuel introduced into the fuel supply conduit 21 from the fuel pump 9 are vaporized in the fuel supply conduit 21 by the heating operation of the heating member 30, whereby bubbles of the fuel vapor are created in the fuel supply conduit 21. The bubbles of the fuel vapor thus created are introduced into the separating chamber 26 together with the liquid fuel consisting of high boiling components. In the separating chamber 26, the bubbles of the low boiling components move upwards in the liquid fuel consisting of high boiling components and are returned to the fuel tank via the conduit 28. On the other hand, the liquid fuel consisting of high boiling components is collected at a position near the bottom of the separating chamber 26. Thus, this liquid fuel is fed into the float chamber 11 via the fuel passage 27 and the needle valve mechanism 17. Since the liquid fuel introduced into the float chamber 11 consists of high boiling components, the liquid fuel is no longer vaporized. Consequently, there is no danger that the fuel vapor will be introduced into the intake passage 19 via the air vent 18 and that the fuel in the fuel passage 12 will be forced out from the main nozzle 13 by the bubbles of the low boiling components.

In the embodiment shown in FIG. 1, the heating member 30 is used as a heat source. However, the fuel supply conduit 21 may be heated by the heat of the engine body 1 in such a way that, instead of using the heating member 30, the fuel supply conduit 21 is located in the engine body 1.

In addition, the fuel supply conduit 21 may be disposed in the cooling water of the engine or in the lubricating oil of the engine. Furthermore, the fuel supply conduit 21 may be routed through the region having a high temperature and located in the engine compartment.

Figure 2:
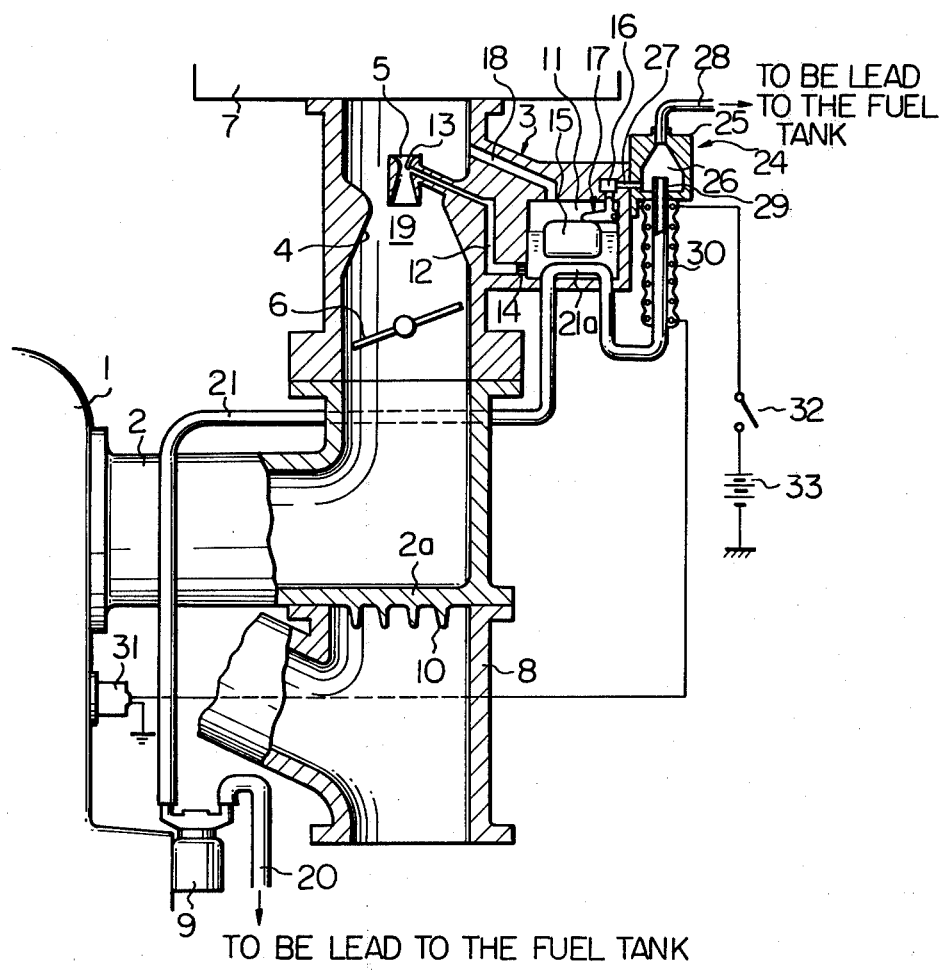
FIG. 2 is a schematic side view, partly in cross section, of another embodiment according to the present invention.

FIG. 2 shows another embodiment according to the present invention. Referring to FIG. 2, the conduit portion 21a of the fuel supply conduit 21 is disposed in the float chamber 11 of the carburetor 3 so that the fuel in the float chamber 11 and the housing of the carburetor 3 are cooled by the fuel flowing in the conduit portion 21a.

FIG. 3 shows a further embodiment according to the present invention. Referring to FIG. 3, the fuel supply conduit 21 is branched off into a pair of branch conduits 21b and 21c. The branch conduit 21b is connected to the separating chamber 26 and is enclosed by the heating member 30 so as to be heated by the heating member 30. On the other hand, the fuel passage 27 communicating the separating chamber 26 with the float chamber 11 is formed by a spiral pipe disposed in an outer casing 34. The inside of the outer casing 34 is connected to the branch conduit 21c, on one hand, and to the fuel tank (not shown) via a conduit 35, on the other hand. As is shown in FIG. 3, it is preferable that the conduit portion 21a of the branch conduit 21c be arranged in the float chamber 11. In this embodiment, a part of the fuel in the fuel supply conduit 21 is fed into the separating chamber 26 via the branch conduit 21b, while the remaining part of the fuel is returned to the fuel tank via the branch conduit 21c. Consequently, in this embodiment, since the fuel passage 27 is cooled by the fuel having a relatively low temperature, it is possible to cool the high boiling components in the fuel fed into the float chamber 11, which is heated by the heating member 30 to a relatively high temperature. In addition, by placing the conduit portion 21a in the float chamber 11, the fuel in the float chamber 11 and the housing of the carburetor 3 can also be cooled.

According to the present invention, since the air-fuel mixture fed into the cylinder of the engine does not become excessively rich when the temperature of the engine is high, a desired operating condition of the engine can always be obtained and an amount of unburned HC and CO components in the exhaust gas can also be reduced. In addition, even if the engine is so constructed that the intake manifold is heated by the exhaust gas, the air-fuel mixture fed into the cylinder of the engine will not become excessively rich when the temperature of the engine is high. Consequently, in an engine adopting an exhaust gas heating system, a desired operating condition of the engine can be obtained while improving the warm-up operation of the engine.

While the invention has been described by referring to specific embodiments chosen for purposes of illustration, it should be apparent that numerous modifications could be made thereto by those skilled in the art without departing from the spirit and scope of the invention.

What is claimed is:

1. A method of feeding fuel in an internal combustion engine having a fuel reservoir and a carburetor with a float chamber therein, said method comprising the steps of:

heating the fuel from the reservoir during passage to the carburetor to create bubbles consisting of the low boiling components of the fuel, using a heating means to create such bubbles when the temperature of the engine is elevated beyond a predetermined level;

separating said bubbles from the fuel using a non-heated separator means having therein a separating chamber for separating bubbles from the heated liquid fuel disposed between the heating means and the float chamber, wherein said fuel is conducted into said separating chamber through a substantially vertically extending portion of a fuel supply conduit;

feeding liquid fuel from which said bubbles have been separated, said liquid fuel consisting of the high boiling components of the fuel, into the carburetor.

2. A method of feeding a fuel as claimed in claim 1, wherein the fuel is heated by the heat of the engine.

3. A method of feeding a fuel as claimed in claim 1, wherein the fuel is heated by a heating device.

4. A method of feeding a fuel as claimed in claim 1, wherein the carburetor and the fuel in the carburetor are cooled by the fuel.

5. A method of feeding a fuel as claimed in claim 1, wherein the liquid fuel consisting of the high boiling components is cooled before it is fed into the carburetor.

6. A fuel feed device of an internal combustion engine, comprising:

a carburetor having a float chamber therein;

a fuel reservoir;

a non-heated separator means having therein a separating chamber for separating bubbles of low boiling components from fuel, said separating chamber having in its lower end a fuel inlet and a fuel outlet, and having in its upper end a bubble outlet which is connected to said fuel reservoir;

a fuel supply conduit having a portion thereof disposed in a heat source for heating fuel in said conduit to create bubbles by vaporizing the low boiling components in the fuel, said fuel supply conduit communicating said fuel inlet with said fuel reservoir and having a substantially vertically extending portion connected to said fuel inlet, and;

a fuel supply passage communicating said fuel outlet with said float chamber.

7. A fuel feed device as claimed in claim 6, wherein said heat source comprises an electrical heating device.

8. A fuel feed device as claimed in claim 7, further comprising means to actuate said heat source when the temperature of the engine is elevated beyond a predetermined level.

9. A fuel feed device as claimed in claim 6, wherein said heat source is the heat of the engine.

10. A fuel feed device as claimed in claim 9, wherein a portion of said fuel supply conduit is disposed in a body of the engine.

11. A fuel feed device as claimed in claim 9, wherein a portion of said fuel supply conduit is disposed in the region having a high temperature and located in an engine compartment.

12. A fuel feed device as claimed in claim 6, wherein a part of said fuel supply conduit is located in the carburetor for cooling the fuel in the carburetor.

13. A fuel feed device as claimed in claim 6, wherein said fuel supply passage comprises a first branch conduit and a second branch conduit connected to said separating means, said second branch conduit having a conduit portion disposed in said heat source and said first branch conduit being disposed in the carburetor for cooling the fuel in the carburetor.

14. A fuel feed device as claimed in claim 13, wherein said first branch conduit is arranged around a conduit communicating the carburetor with said separating means for cooling the fuel introduced into the carburetor.

15. A fuel feed device as claimed in claim 6, wherein said separating chamber has on its lower end a bottom, said fuel outlet being arranged in the vicinity of said bottom, said fuel inlet being formed on an upper end of a pipe projecting upwards into said separating chamber from said bottom.

16. A fuel feed device as claimed in claim 6, wherein the upper half of said separating chamber is formed in a conical shape, the lower half of said separating chamber is formed in a cylindrical shape.

* * * * *